(12) United States Patent
Stefan et al.

(10) Patent No.: US 9,181,128 B2
(45) Date of Patent: Nov. 10, 2015

(54) GRINDING ADDITIVE FOR MINERAL BINDERS

(71) Applicant: Construction Research & Technology GmbH, Trostberg (DE)

(72) Inventors: Madalina Andreea Stefan, Trostberg (DE); Torsten Freund, Limburgerhof (DE); Lorenzo Ambrosini, Oberengstringen (CH); Attilio Camplone, Pescara (IT); Stijn Brughmans, Ludwigshafen (DE); Jürgen Faderl, Ilvesheim (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 14/396,636

(22) PCT Filed: Apr. 22, 2013

(86) PCT No.: PCT/EP2013/058240
§ 371 (c)(1),
(2) Date: Oct. 23, 2014

(87) PCT Pub. No.: WO2013/164212
PCT Pub. Date: Nov. 7, 2013

(65) Prior Publication Data
US 2015/0166412 A1    Jun. 18, 2015

(30) Foreign Application Priority Data

May 3, 2012 (EP) .................................... 12166513

(51) Int. Cl.
| | |
|---|---|
| *C04B 7/52* | (2006.01) |
| *C04B 24/12* | (2006.01) |
| *C04B 40/00* | (2006.01) |
| C04B 103/52 | (2006.01) |

(52) U.S. Cl.
CPC ............... *C04B 24/128* (2013.01); *C04B 7/52* (2013.01); *C04B 24/123* (2013.01); *C04B 40/0039* (2013.01); *C04B 2103/52* (2013.01)

(58) Field of Classification Search
CPC .. C04B 24/128; C04B 24/123; C04B 24/085; C04B 7/52; C04B 40/0039; C04B 2103/52
USPC .................... 106/709, 724, 728, 802, 810
See application file for complete search history.

(56) References Cited

U.S. PATENT DOCUMENTS

| | | | |
|---|---|---|---|
| 3,443,976 A | 5/1969 | Dodson et al. | |
| 4,990,190 A | 2/1991 | Myers et al. | |
| 5,017,234 A | 5/1991 | Gartner et al. | |
| 5,084,103 A | 1/1992 | Myers et al. | |
| 5,156,679 A | 10/1992 | Gartner et al. | |
| 2003/0027977 A1 | 2/2003 | Koning et al. | |

FOREIGN PATENT DOCUMENTS

| | | | | |
|---|---|---|---|---|
| DE | 600 19 810 T2 | 1/2006 | | |
| SU | 1 414 825 A1 | 8/1988 | | |
| SU | 1574565 A1 | * | 6/1990 | ............. C04B 24/18 |
| SU | 1 606 490 A1 | 11/1990 | | |
| SU | 1692967 A1 | * | 11/1991 | ............. C04B 41/62 |

OTHER PUBLICATIONS

Qiao et al, "A Simplified Processing Technique of Organic-Inorganic Intercalation/Exfoliation Nanohybrid", Materials Research Bulletin 42 (2007) 1332-1336.*
PCT/EP2013/058240—International Search Report, Sep. 24, 2013.
PCT/EP2013/058240—International Written Opinion, Sep. 24, 2013.
PCT/EP2013/058240—International Preliminary Report on Patentability, Nov. 4, 2014.

* cited by examiner

*Primary Examiner* — Anthony J Green
(74) *Attorney, Agent, or Firm* — Curatolo Sidoti Co., LPA; Joseph G. Curatolo; Vincent A. Cortese

(57) ABSTRACT

The invention relates to a method for grinding an inorganic solid from the series cement clinker, pozzolan and/or raw material for cement production, where a grinding additive is added before or during grinding, and the grinding additive, based on the dry mass, comprises 6% to 80% by weight of caprolactam and 1.5% to 30% by weight of aminocaproic acid, where, based in each case on the dry mass, 0.002% to 2% by weight of the grinding additive is used, based on the total solid. Further claimed are a grinding additive and the use thereof for increasing the compressive strength of the cured product produced therewith.

12 Claims, No Drawings

GRINDING ADDITIVE FOR MINERAL BINDERS

CROSS REFERENCE TO RELATED APPLICATIONS

This application is a national stage application of International Application No. PCT/EP2013/058240, filed 22 Apr. 2013, which claims priority from European Patent Application No. 12166513.7, filed 3 May 2012, from which applications priority is claimed, and which are incorporated herein by reference.

The invention relates to a method for grinding an inorganic solid from the series of cement clinker, pozzolan and/or raw material for cement production, to a grinding additive and to the use thereof.

Substances are considered hydraulic when they harden both in air and under water and are water-resistant. Hydraulic binders are, more particularly, cement and pozzolans, such as flyash, blast furnace slag and trass, for instance.

The greatest economic importance among the hydraulic binders is possessed by cement. Made up with water, cement produces cement slurry, which solidifies by hydration and hardens, and which even after hardening remains solid and three-dimensionally stable under water. Cement consists substantially of Portland cement clinker and may further comprise, for example, slag sand, pozzolan, flyash, limestone, fillers and cement admixtures. Viewed statistically, the cement constituents must be homogeneous in terms of their composition, and this can be achieved in particular by appropriate grinding and homogenizing techniques.

In spite of numerous developments in grinding technology, the major part of the cement and a part of the raw materials for cement production are still ground in tubular ball mills, where the effect of grinding additives is accorded particular significance.

For clinker production, the cement raw materials are generally dry-ground. In the course of the dry preparation procedure, the raw material components are fed to a mill in a particular mixing ratio, by way of metering devices, and are finely ground to a raw-ground state. Effective grinding of the raw materials is critical to good clinker quality. Following clinker production, the clinker is ground again, alone or with other cement additives (SCMs—supplementary cementitious materials).

In the case of the grinding of cement clinker or of limestone, but also in the case of pozzolans and other raw materials for cement production, a particular function of grinding additives is that of allowing a greater fineness of grind of the grind stock and of preventing agglomeration within the mill.

Grinding additives act by enveloping the particles that have a tendency towards agglomeration with thin layers, more particularly monomolecular layers, and thus lead to neutralization of the surface charges. Viewed physically, the grinding additives rapidly provide charge carriers which are available for satisfying the charges which come about on the fracture surfaces during fracture of the clinker particles, and so reduce the tendency towards agglomeration. In addition, grinding additives are absorbed on the fracture surfaces of the grains prior to separation, and prevent them from reuniting. The mechanistic action of grinding additives is described for example in "Proceedings of 11th ICCC 2003", Vol. 2, page 1636.

The activity of known grinding additives is very varied. The amount in which grinding additives are added, based on the grind stock, is typically between 0.02% and 0.3% by weight. The known grinding additives include, for example, glycols, more particularly, mono-, di-, tri- and polyglycols, polyalcohols such as glycerol, for instance, alkanolamines, more particularly triethanolamine and triisopropanolamine, organic acids, more particularly acetic acid, or salts thereof, amino acids, molasses, and also organic and inorganic salts, based more particularly on acetate, formate, gluconate, chloride, fluoride, nitrate and sulphate.

In practice, a suitable grinding additive is selected by aiming to optimize the following parameters in particular: preventing caking in the grinding assembly, obtaining the maximum fineness of grind or maximum specific surface area of the grind stock, improving the fluidity of the grind stock, homogenizing the grind stock, disrupting agglomerates of the grind stock, and reducing the costs of the grinding operation. In the final grinding of hydraulic binders, in particular, grinding additives, as well as their action during the grinding procedure, may also have a positive effect on subsequent curing and on the mechanical properties of the cement, and this is a particular advantage.

Grinding additives may therefore also be added in order to modify the physical properties of the finished cement. Alkanolamines such as monoethanolamine, diethanolamine and triethanolamine increase the 1-day compressive strength of cements, a parameter also referred to as early strength. These additives, however, have little advantageous effect on the 28-day setting strength of the finished cement, and in some cases may even lower this parameter. This behaviour has been described by V. Dodson, in "Concrete Admixtures", Van Reinhold, N.Y., 1990.

U.S. Pat. No. 4,990,190, U.S. Pat. No. 5,017,234 and U.S. Pat. No. 5,084,103 describe how certain higher trihydroxyalkylamines, such as triisopropanolamine and N,N-bis(2-hydroxyethyl)-2-hydroxypropylamine, improve the late strength, after 28 days, after production of the wet cement mixture from Portland cement. The strength-enhancing higher trihydroxyalkylamine additives that are described in these patents are said to be particularly useful in mixed cements.

Although triisopropanolamine is able to improve the late strength properties of cement compositions, it is able only to a very limited degree to improve the early strength. More surprising is the observation that it tends to increase the amount of air entrained into the cement. In order to improve the early strength and the air entrainment properties of the set cement composition comprising triisopropanolamine, Myers et al. taught the introduction of known early strength enhancers and setting accelerators, such as triethanolamine or alkali metal salts, and of known air removers, such as those described in U.S. Pat. No. 5,156,679.

Although the introduction of air removers into triisopropanolamine-containing cement compositions was able to lower the air content, it was unable to reduce or eliminate the formation and release of bubbles from the cement compositions. This phenomenon can lead to set cement compositions with a high porosity and poor finished surfaces.

It would be highly desirable, therefore, to have an additive which is able to improve the strength properties at all stages of ageing, without entraining large air pores. This is desirable since it is able to result in compositions comprising hydraulic binders, such as Portland cement concrete, having low porosities and better finished surfaces.

Given that cement is a mass product, the production costs have a decisive part to play. Even relatively small savings in raw materials or energy may have a considerable influence on the economics of the operation.

SU 1 424 825 and SU 1 606 490 describe the addition of by-products from the production of caprolactam to a concrete mix. The additive is added to the mix with the mixing water.

It was an object of the present invention, therefore, to provide grinding additives which firstly have very good properties as grinding additives for an inorganic solid from the series of cement clinker, pozzolan and/or raw material for cement production. The intention more particularly was to achieve a reduction in the energy expended for a given grinding outcome. Furthermore, it was intended that the grinding additive should improve the strength properties at all stages of ageing, for cement clinker and pozzolans, and therefore should produce, on curing, not only a very good early strength after one day, but also a high late strength after 28 days.

This object has been achieved by a method for grinding an inorganic solid from the series of cement clinker, pozzolan and/or raw material for cement production, where a grinding additive is added before or during grinding,
where the grinding additive, based on the dry mass, comprises,
6% to 80% by weight of caprolactam and
1.5% to 30% by weight of aminocaproic acid,
where, based in each case on the dry mass, 0.002% to 2% by weight of the grinding additive is used, based on the total inorganic solid.

Surprisingly it has been found that the products ground with the grinding additive of the invention exhibit a reduced agglomeration tendency, hence having a good pack set, which also impacts positively on grindability and on the dispersing properties. A particular consequence of a very good pack set is that the products produced flow very readily, and this is desirable in the context, for example, of storage in silos.

The grinding additives of the invention additionally display a very good effect during grinding, and not only for cement clinker and pozzolan but also for raw materials for the cement production reduce the energy to be expended for a given grinding outcome. The stated object is therefore achieved in full, and additionally, for cement and pozzolans, after being made up with water, not only a very good early strength after one day but also an outstanding late strength after 28 days are achieved.

The grinding additive of the invention may preferably comprise at least one further grinding additive from the series of polycarboxylate ethers, lignosulphonate, melamine-formaldehydesulphonate, naphthalene-formaldehydesulphonate, mono-, di-, tri- and polyglycols, polyalcohols, alkanolamine, amino acids, sugars, molasses, and also organic and inorganic salts.

The grinding additive may more particularly comprise 3% to 70% by weight of at least one alkanolamine or alkanolamine salt. In this context the at least one alkanolamine of the invention may comprise monoethanolamine, diethanolamine, triethanolamine, monoisopropanolamine, diisopropanolamine, triisopropanolamine, diethanolisopropanolamine, ethanoldiisopropanolamine, hydroxyalkyl-substituted ethylene polyamines, hydroxyalkyl-substituted alkyl diamines, more particularly dihydroxyethylethylenediamine, trihydroxyethylethylenediamine, tetrahydroxyethylethylenediamine, dihydroxypropylethylenediamine, trihydroxypropylethylenediamine, tetrahydroxypropylethylenediamine, polyhydroxyalkyl-substituted polyethyleneamine, poly(hydroxyethyl)polyethyleneimine, N,N-bis(2-hydroxyethyl)-2-propanolamine and N,N-bis(2-hydroxypropyl)-N-(hydroxyethyl)amine, N,N,N',N'-tetra(2-hydroxyethyl)ethylendiamine, N,N,N',N'-tetra(2-hydroxypropyl) ethylendiamine and methyldiethanolamine. Particularly preferred are triisopropanolamine and triethanolamine. The stated alkanolamines may additionally be present in salt form, more preferably with organic anions, more particularly formate, acetate and propionate.

The raw material for cement production may more particularly be at least one from the series of limestone, limestone marl, clay, chalk, silica sand and iron ore.

The term "cement clinker" is used in the present document to refer more particularly to Portland cement clinkers but also to binders which set, or harden, under water, such as hydraulic lime, for example. The term "cement clinkers" also refers for the purposes of the present invention to latent hydraulic binders which set, or harden, only under the action of admixtures, known as promoters, an example of such binders being slag sand.

The term "pozzolans" refers for the purposes of the present invention to binders which do not set by themselves but instead, after storage under moist conditions, yield reaction products which are strength-forming, as a result of the formation of calcium hydroxide, examples of such binders being flyash, blast furnace slag, microsilica, and also natural pozzolans, such as trass and metakaolin, for example. Other pozzolans which do not set by themselves may be ashes from the combustion of natural products, such as rice husks and grain hulls.

In one preferred embodiment, based on the dry mass, 0.01% to 0.5% by weight, more particularly 0.01% to 0.2% by weight of the grinding additive of the invention is used, based on the inorganic solid. In one specific embodiment, the grinding additive of the invention is added before grinding to the composition that is to be ground, and grinding then takes place. In principle, however, the grinding additive of the invention can also be added during the grinding operation. Addition before grinding, however, is preferred.

Where the composition to be ground is cement clinker, the addition may be made before, during or after the addition of gypsum and optionally other ground ingredients, such as limestone, blast furnace slag, flyash or pozzolans, for example. The grinding additive of the invention may also be used for the production of mixed cements. For this purpose, individual cement raw materials, each produced separately by grinding, can be mixed, with at least one of the individual cement components being ground with the grinding additive of the invention, or a mixture of two or more cement components being ground with the grinding additive of the invention to give a mixed cement.

The grinding additive of the invention is applied preferably as an aqueous suspension to the inorganic solid. In one preferred embodiment, the grinding additive, based on the dry mass, may comprise 1% to 20% by weight of alkali metal hydroxide, more particularly sodium hydroxide. With further preference, the grinding additive may comprise caprolactam oligomers, more particularly 1% to 50% by weight.

Especially suitable as grinding additives of the invention are specific products from the preparation of caprolactam. Specific products of this kind are obtained in the preparation of caprolactam by the cyclohexanone oxime process via hydroxylamine (Hans Jürgen Arpe, Industrielle Organische Chemie, 2007 Wiley-VCD, page 281). As well as caprolactam, these products also contain aminocaproic acid. The product in question is more preferably a product of caprolactam preparation that comprises, based on the dry mass, 6% to 80% by weight of caprolactam, 2% to 20% by weight of oligomers of caprolactam, 1.5% to 30% by weight of aminocaproic acid, 1% to 20% by weight of alkali metal hydroxide, and optionally up to 20% by weight of other organic constituents.

The grinding operation takes place typically in a ball mill. It is, however, also possible in principle to use other mills of the kind known within the cement industry. In one preferred embodiment the grinding is carried out in a vertical roller mill.

The fineness of the cement varies according to the grinding time. The fineness of inorganic solids is indicated typically in $cm^2/g$ according to Blaine. The fineness and the particle size distribution are highly relevant to practice. Such particle size analyses are determined typically by laser granulometry or air-jet sieves. Through the use of the aqueous grinding additives of the invention it is possible to achieve a marked reduction in the grinding time to achieve the desired fineness of inorganic solids from the series of cement clinker, pozzolan and/or raw material for cement production. As a result of the thus-reduced energy costs, the use of these grinding additives is of great interest economically. From the products obtained in accordance with the invention it is possible to produce a very wide variety of downstream products, more particularly those cements classed under DIN EN 197-1 as CEM-I (Portland cement), CEM II and CEM III (blast furnace cement). CEM-I is preferred.

It has also been found that when the grinding additives of the invention are used with cement clinker or pozzolans, there is little or no air entrainment, whereas air entrainment is very much prevalent when the grinding additive used is pure triisopropanolamine.

The present invention further provides an inorganic solid from the series of cement clinker, pozzolan and/or raw material for cement production that is produced by the method of the invention.

The present invention further provides for the use of a mixture comprising, based on the dry mass, 6% to 80% by weight of caprolactam and 1.5% to 30% by weight of aminocaproic acid as a grinding additive for an inorganic solid from the series of cement clinker, pozzolan and/or raw material for cement production, where, based in each case on the dry mass, 0.002% to 2% by weight of the grinding additive is used, based on the inorganic solid, for reducing the energy expended for a given grinding outcome and also for reducing the agglomeration tendency of the resultant product.

The present invention further relates to a grinding additive for a composition which comprises a hydraulic binder, comprising 6% to 80% by weight of caprolactam, 1.5% to 30% by weight of aminocaproic acid and 3% to 70% by weight of at least one further grinding additive from the series of polycarboxylate ethers, lignosulphonate, melamine-formaldehydesulphonate, naphthalene-formaldehydesulphonate, mono-, di-, tri- and polyglycols, polyalcohols, alkanolamine, amino acids, sugars and molasses. With particular preference the further grinding additive is an alkanolamine and/or an alkanolamine salt.

The present invention makes available, in particular, grinding additives which exhibit an outstanding effect during the grinding procedure and more particularly lead to a reduction in the energy to be expended for a given grinding outcome. Furthermore, the ground product has a reduced agglomeration tendency, hence exhibiting a good pack set, and this is a great advantage especially in the context of the storage of the product. With regard to the grinding of cement clinker and pozzolans, the grinding additives of the invention also have a positive effect on the subsequent curing and on the mechanical properties of the ground product. In particular, the strength properties were improved at all stages of ageing after make-up with water, and a very good early strength after one day and also a high late strength after 28 days were achieved.

The examples which follow illustrate the advantages of the present invention

EXAMPLES

General Test Procedure

The grinding tests are carried out in a laboratory ball mill. A total weight of 12.30 kg is weighed out, including 307.5 grams of anhydrite, weighed out beforehand on a precision balance; the remainder is Portland cement clinker. Based on this total weight, 200 ppm of the grinding additive are added in the mill. Grinding is then carried out for 80 minutes at an internal mill temperature of 120° C. The resultant cement is sieved through a 1 mm sieve in order to remove the grinding beads.

Subsequently, in accordance with EN 196-1, the cements are used to produce a mortar having a water/cement ratio of 0.5 and a sand/cement ratio of 3, and the flexural tensile strength and also the compressive strength are tested in accordance with the same standard after 1, 2, 7 and 28 days (d). This mortar is additionally investigated for its air content in accordance with EN 196-1 and for its slump in accordance with EN 413-2. The air content is determined immediately after the end of mixing. The slump is determined immediately after the end of mixing and 30 minutes after addition of water. Here, in deviation from the standard, the mortar is introduced into the hopper in a layer and is compacted by rodding.

TABLE 1

| Grinding additive | Slump 0' | Slump 30' | Air content immediate | Compressive strength (N/mm²) 1 d | 2 d | 7 d | 28 d |
|---|---|---|---|---|---|---|---|
| None | 19.8 | 18.6 | 6.10% | 10.43 | 22.62 | 43.32 | 58.28 |
| 200 ppm TIPA | 20.3 | 19 | 8.70% | 9.875 | 21.27 | 47.13 | 61.32 |
| 200 ppm TEA | 20.2 | 19.3 | 5.20% | 13.68 | 25.8 | 46.3 | 61.06 |
| 200 ppm TEA/ inventive grinding additive "A" (1:1) | 20.1 | 18.7 | 6.50% | 13.86 | 25.59 | 47.75 | 62.26 |

TIPA = triisopropanolamine
TEA = triethanolamine
Inventive grinding additive "A" = product from preparation of caprolactam, containing 30.2% by weight caprolactam monomer, 14.1% by weight oligomers of caprolactam, 7% by weight aminocaproic acid, 26.6% by weight water, 5.2% by weight NaOH and 11.9% by weight other organic constituents.

The agglomeration tendency (pack set) is measured as follows:

The samples are produced as described in the general test procedure, with the amount of grinding additive indicated in Table 2 being added in each case. The product obtained after grinding is sieved (200 μm mesh size) and 100 g of the material obtained is applied to an electromagnetically operated shaker sieve (manufacturer: Matest S.p.A. Unipersonale), the sieve having a diameter of 300 mm and a mesh size of 200 μm and being free of fixed connection to the shaker. After the shaker has been switched on, with a power of 450 watts, a measurement is made of the time taken for the entire sample to pass through the sieve.

TABLE 2

| Grinding additive | Metering of grinding additive | Time (seconds) until whole sample has passed through sieve (pack set) |
|---|---|---|
| None | 0 ppm | 168 |
| TEA | 500 ppm | 70 |
| Inventive grinding additive "A" | 500 ppm | 65 |

The invention claimed is:

1. A method comprising grinding an inorganic solid comprising at least one of cement clinker, pozzolan or raw material for cement production, wherein a grinding additive is added before or during said grinding, wherein the grinding additive, based on dry mass, comprises
    6% to 80% by weight of caprolactam and
    1.5% to 30% by weight of aminocaproic acid,
    wherein 0.002% to 2% by weight of the grinding additive is added, based on total dry mass of the inorganic solid.

2. The method according to claim 1, wherein the grinding additive additionally comprises at least one of polycarboxylate ethers, lignosulphonate, melamine-formaldehydesulphonate, naphthalene-formaldehydesulphonate, mono-, di-, tri- and polyglycols, polyalcohols, alkanolamine, amino acids, sugars, molasses, organic or inorganic salts.

3. The method according to claim 1, wherein the grinding additive comprises 3% to 70% by weight of at least one alkanolamine or alkanolamine salt.

4. The method according to claim 1, wherein 0.01% to 0.5% by weight of the grinding additive is added, based on the inorganic solid.

5. The method according to claim 1, wherein the grinding additive is applied as an aqueous suspension to the inorganic solid.

6. The method according to claim 1, wherein the grinding additive is applied before grinding.

7. The method according to claim 1, wherein the grinding additive, based on the dry mass, comprises 1% to 20% by weight of alkali metal hydroxide.

8. The method according to claim 1, wherein the grinding additive comprises caprolactam oligomers.

9. The method according to claim 1, wherein the raw material for cement production comprises at least one of limestone, limestone marl, clay, chalk, silica sand or iron ore.

10. The method according to claim 1, wherein grinding is carried out in a vertical roller mill.

11. Inorganic solid comprising at least one of cement clinker, pozzolan or raw material for cement production, produced by a method according to claim 1.

12. A grinding additive for an inorganic solid comprising at least one of cement clinker, pozzolan or raw material for cement production, comprising
    6% to 80% by weight of caprolactam,
    1.5% to 30% by weight of aminocaproic acid and
    3% to 70% by weight of at least one further grinding additive comprising at least one of polycarboxylate ethers, lignosulphonate, melamine-formaldehydesulphonate, naphthalene-formaldehydesulphonate, mono-, di-, tri- and polyglycols, polyalcohols, alkanolamine, amino acids, sugars and molasses.

* * * * *